(12) United States Patent
Van Hoyweghen et al.

(10) Patent No.: US 8,715,813 B2
(45) Date of Patent: May 6, 2014

(54) HIGH MIR LINEAR POLYETHYLENES AND COEXTRUDED FILMS THEREFROM

(75) Inventors: Danny Van Hoyweghen, Heverlee (BE); Stefan B. Ohlsson, Keerbergen (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 407 days.

(21) Appl. No.: 13/063,270

(22) PCT Filed: Oct. 23, 2008

(86) PCT No.: PCT/US2008/080961
§ 371 (c)(1),
(2), (4) Date: Mar. 10, 2011

(87) PCT Pub. No.: WO2010/047709
PCT Pub. Date: Apr. 29, 2010

(65) Prior Publication Data
US 2011/0165395 A1    Jul. 7, 2011

(51) Int. Cl.
*B32B 7/02*    (2006.01)

(52) U.S. Cl.
USPC .......................... 428/212; 428/218; 428/220

(58) Field of Classification Search
USPC .......................................... 428/212, 218, 220
See application file for complete search history.

(56) References Cited

U.S. PATENT DOCUMENTS

| | | |
|---|---|---|
| 5,998,017 A | 12/1999 | Eichbauer |
| 6,093,480 A | 7/2000 | Eichbauer |
| 6,242,545 B1 | 6/2001 | Jejelowo et al. |
| 6,248,845 B1 | 6/2001 | Loveday et al. |
| 6,503,637 B1 * | 1/2003 | Van Loon ..................... 428/516 |
| 6,528,597 B2 | 3/2003 | Loveday et al. |
| 6,936,675 B2 | 8/2005 | Szul et al. |
| 6,956,088 B2 | 10/2005 | Farley et al. |
| 7,157,531 B2 | 1/2007 | Szul et al. |
| 7,172,816 B2 | 2/2007 | Szul et al. |
| 7,179,876 B2 | 2/2007 | Szul et al. |
| 2003/0096128 A1 | 5/2003 | Farley et al. |
| 2004/0097365 A1 | 5/2004 | Loveday et al. |
| 2004/0176242 A1 | 9/2004 | Ishihama et al. |
| 2005/0058847 A1 | 3/2005 | Szul et al. |
| 2005/0171283 A1 | 8/2005 | Szul et al. |
| 2006/0188678 A1 | 8/2006 | Ohlsson et al. |
| 2007/0260016 A1 | 11/2007 | Best et al. |
| 2008/0038533 A1 | 2/2008 | Best et al. |
| 2009/0297810 A1 | 12/2009 | Fiscus et al. |
| 2011/0003099 A1 | 1/2011 | Vinck |

FOREIGN PATENT DOCUMENTS

| | | |
|---|---|---|
| EP | 1 518 868 | 3/2005 |
| WO | 90/03414 | 4/1990 |
| WO | 02/04556 | 1/2002 |
| WO | 2004/022646 | 3/2004 |
| WO | 2005/103095 | 11/2005 |
| WO | 2007/130277 | 11/2007 |
| WO | 2007/141036 | 12/2007 |

* cited by examiner

*Primary Examiner* — Aaron Austin
*Assistant Examiner* — Lawrence Ferguson
(74) *Attorney, Agent, or Firm* — Kevin M. Faulkner; Samuel E. Shehadeh; Leandro Arechederra, III

(57) ABSTRACT

A high clarity, high throughput film comprising at least two skin layers and at least one core layer there between, wherein the skin layers comprise at least one linear ethylene-α-olefin copolymer having an $I_{21}/I_2$ of greater than 20; a density within the range from 0.910 to 0.945 $g/cm^3$ and CDBI of less than 40; and the core layer comprises at least one polyethylene having an overall density of at least 0.910 $g/cm^3$; wherein the film has a dart impact (ASTM D1709) of greater than 10 g/μm and a Haze (ASTM D1003 method B) of less than 10%.

13 Claims, No Drawings

HIGH MIR LINEAR POLYETHYLENES AND COEXTRUDED FILMS THEREFROM

CROSS REFERENCE TO RELATED APPLICATIONS

This application is a National Stage Application of International Published No. WO2010/047709, which is related to US Publication Nos. 2007/0260016; 2008/0038533; 2009/0297810; and 2011/0003099, all of which are hereby incorporated by reference in their entirety.

FIELD OF THE INVENTION

The disclosure relates to linear ethylene-α-olefin copolymers as a film component with selected density and Melt Index Ratio and to co-extruded films, especially those made by blown film co-extrusion processes, using linear ethylene-α-olefin copolymers. The co-extruded films may be used to produce packages. The films have an improved balance of optical and mechanical properties and processability.

BACKGROUND

Film producers have to balance A) the processability, which determines the maximum achievable output per film extrusion machine in order to reduce manufacturing costs; B) the mechanical strength such as the impact strength to make stronger films for a given thickness and reduce the overall consumption of polymer for a given performance, and C) the optical properties such as haze.

Films made from conventional Ziegler-Natta catalyzed linear low density polyethylenes (znLLDPE) are known to have favorable physical properties such as high tensile strength. Films prepared from metallocene catalyzed linear low density polyethylenes (mLLDPE) exhibit improved tensile strength and puncture resistance, as well as improved impact resistance. Thus, the film industry has sought a polyethylene film that exhibits favorable properties similar to, or better than, those of films prepared with znLLDPE while maintaining the advantages of mLLDPE.

While the prior art may describe processes and polymers using certain linear ethylene-α-olefin copolymers, none describe multi-layer films having a dart impact (ASTM D1709) of greater than 10 g/μm and a Haze (ASTM D1003 method B) of less than 10%. Single layer blown films having an improved dart impact (over comparable films made from mLLDPE) are disclosed in U.S. Pat. No. 6,956,088. Provided herein are multilayer blown films having an improved balance of properties, in particular, improved impact resistance when compared to current LLDPEs with comparable or higher clarity.

SUMMARY

Disclosed in one embodiment is a blown film comprising at least two skin layers and at least one core layer there between, wherein the film has a dart impact (ASTM D1709) of greater than 10 g/μm, a Haze (ASTM D1003 method B) of less than 10%, an MD Tensile Break of greater than 45 MPa, and a TD Tensile Break of greater than 35 MPa.

Also disclosed is a blown film with a dart impact (ASTM D1709) of greater than 10 g/μm and a Haze (ASTM D1003 method B) of less than 10% comprising at least two skin layers and at least one core layer there between, wherein the core layer comprises at least one polyethylene having an overall density of at least 0.910 g/cm³; and the skin layers comprise at least one linear ethylene-α-olefin copolymer having an $I_{21}/I_2$ of greater than 20; a density within the range from 0.910 to 0.945 g/cm³; an Mw/Mn within the range from 2.0 to 5.0; and at least a 5 wt % portion that is soluble at 60° C. or less in xylene, where the soluble portion has:
  an Mw (GPC) of 150,000 g/mol or more;
  at least 5 mol % $C_3$ to $C_{20}$ comonomer as determined by $^{13}$C NMR,
  a $r_1r_2$ value of 1.0 or less, and
  a "butyls" per 1000 carbons value of 15 or more.

Also disclosed is a method of producing a film comprising coextruding through an annular die a melt of at least the one core layer composition having two faces and at least one skin layer composition comprising one or more linear ethylene-α-olefin copolymers, each skin adjacent to both faces of the core layer; followed by drawing the tubular melts by blowing the layered melts into a bubble by air fed through the die, wherein the films are obtained by extruding the one or more linear ethylene-α-olefin copolymers through the blown film die at a stretch rate of 2 sec⁻¹ or more, a processing time of 2 seconds or less, a blow up ratio of 2.5 or less, a frost line height of 1.0 meter or less, and a die throughput rate of 2.0 kg/hr/cm of die circumference or more.

The various descriptive elements and numerical ranges disclosed herein can be combined with other descriptive elements and numerical ranges to describe preferred embodiments of the film(s) or compositions making up the film(s); further, any upper numerical limit of an element can be combined with any lower numerical limit of the same element to describe preferred embodiments. In this regard, the phrase "within the range from X to Y" is intended to include within that range the "X" and "Y" values.

DETAILED DESCRIPTION

Disclosed herein are blown multilayer films having skin layer(s) comprising at least one linear ethylene-α-olefin copolymer having exceptional impact resistance and clarity. The core layer(s) of such films comprises "polyethylenes" (linear ethylene-α-olefin copolymers, HDPEs, LLDPEs, HPPEs, and blends thereof), and consists essentially of polyethylenes in a particular embodiment. The "linear ethylene-α-olefin copolymer" is a polyolefin that combines the positive film-forming attributes of current mLLDPEs with the positive film-forming attributes of current znLLDPEs, and is described more particularly below. The films can be described using a range of parameters, but in one embodiment is described as a blown film comprising at least two skin layers and at least one core layer there between, wherein the skin layer(s) comprise at least one linear ethylene-α-olefin copolymer having an $I_{21}/I_2$ (21.6/2.16 kg, 190° C.) of greater than 20; and a density within the range from 0.910 to 0.945 g/cm³. The film(s) can be described in combination with, or alone, as possessing a dart impact (ASTM D1709) of greater than 10 g/μm and a Haze (ASTM D1003 method B) of less than 10%. The film can be described further by the various features below.

As used herein, the term "layer" refers to each of the one or more compositions, the same or different, that are secured to one another in thin sheet- or film-form by any appropriate means such as by an inherent tendency of the materials to adhere to one another, or by inducing the compositions to adhere as by a heating, radiative, chemical, or some other appropriate process. The term "layer" is not limited to detectable, discrete compositions contacting one another such that a distinct boundary exists between the compositions. Preferably however, the composition used to make one layer of a film will be different (i.e., the weight percent of components, the properties of each component, and/or the identity of the components may differ) from the composition used to make an adjacent layer, when present. The term "film" includes a finished product having a continuum of compositions throughout its thickness. The "films" described herein comprise at least two, three or more "layers."

Suitable film structures ("films") include, for example, "ABA" type structures, wherein a film having the ABA or A'BA (A is different from A') structure has three layers, a core layer made from "B", and outer (or "skin") "A" layers on either or both faces of "B". Each "A" or "B" layer in a film may be the same or different. Non-limiting examples of other structures include AB, ABAB, ABA, AAB, AA'B, AABAA, BABBA, ABAA, ABBAB, ABBAABB, ABABA, ABABAB, ABA'BA"B, AABBBA, and other variants comprising from 2 or 3 to 5 or 6 or 7 or 8 or more layers. In a particular embodiment, the films are of the AB and ABA type, wherein "A" comprises a linear ethylene-α-olefin copolymer and the "B" layer comprising one or more types of "polyethylenes." In certain embodiments, propylene-based polymers are absent from the films and/or any layer of the films disclosed herein; "propylene-based polymers" meaning polymers comprising at least 50 wt % propylene-derived units.

As used herein, the term "linear low density polyethylene" ("LLDPE") refers to a transition-metal catalyzed polyethylene homopolymer or copolymer having a density from 0.910 g/cm$^3$ to 0.935 g/cm$^3$. The polymers described as linear polyethylenes above may be made using different catalyst systems. The prefix "zn" is used in the specification and claims as in "znLLDPE" to indicate that a conventional Ziegler-Natta type catalyst system was used, generally with a titanium compound as the transition metal component and an aluminum alkyl as cocatalyst. Such catalysts are generally regarded as multi-sited and provide active sites with different activity levels. The term "mLLDPE" indicates that the transition metal component used was a single site catalyst, which generally refers to a transition metal component such as a metallocene or metal-imide/amine compound activated by methods well known for such components, such as alumoxane or a non-coordinating anion. For the sake of convenience, polyethylenes made using single sited catalysts other than metallocene are also indicated using the "m" prefix. The different catalysts influence the molecular weight distribution, the composition distribution, the sequence distribution and chain termination moieties, which together with an analysis of catalyst residue readily permit a person skilled in the art to distinguish the mLLDPE and znLLDPE types. Linear polyethylenes of the "zn" types tend to have a greater heterogeneity in terms of molecular weight distribution and composition distribution as compared to "m" linear polyethylene types due to the multi-sited nature of the catalyst. The heterogeneity may be determined by suitable fractionation techniques appropriate to the density concerned, such as a measurement of the molecular weight distribution by GPC, the compositional distribution by a temperature rising elution fractionation ("TREF") measurement or a Crystaf measurement. As used herein in the description and claims "zn" linear polyethylene types refer to polyethylenes, analyzable by elution fractionation, having a $T_{75}$-$T_{25}$ determined as described herein of at least 20° C., optionally together with low $T_{25}$, typically less than 70° C., indicative of the presence of a significant level of easily eluted low molecular weight, high comonomer polymer fraction. At low densities other fractionation techniques can be used to distinguish "zn" and "m" types of linear polyethylene. The znLLDPE polymers described above are well know in the art and may be made by conventional polymerization techniques.

A "high density polyethylene" ("HDPE") is a polyethylene homopolymer or copolymer having a density of greater than 0.945 g/cm$^3$ or more and are well known in the art. Examples of useful HDPEs include ExxonMobil™ high density polyethylenes and Paxon™ high density polyethylenes (ExxonMobil Chemical Co.).

As used herein, the term "high pressure polyethylene" ("HPPE") refers to the product of free-radical initiated polymerization and comprises at least 85 mol % of units derived from ethylene. The resulting polymer is generally described as having a non-linear structure and being heterogeneously branched. The heterogeneous branching in HPPE is presumed to result from the incorporation of short chain and long chain branches of varying size and branch structures. HPPE is polymerized using free radical initiators and these cause the irregular incorporation of branches of varying length and structure into a main chain away by what is usually described as a "back-biting" mechanism. Such polymers are highly non-linear. The $C^{13}$ NMR spectrum of the HPPE, shows a statistically probable distribution of shorter branches and is different from that of linear polyethylenes where the NMR peaks of the shorter branches result from the short chain branches formed by comonomer incorporation. HPPE includes (A) low density polyethylene (LDPE) which is defined herein as containing less than 7.5 mol % of units derived from comonomers containing polar moieties such a carbonyl groups, including ethylenically unsaturated esters, e.g. vinyl acetate, ethylene methyl acrylate, ethylene methacrylic acid or ethylene acrylic acid and (B) heterogeneously branched ethylene vinyl acetate containing more than 7.5 mol % of such comonomer having polar moieties. Where HPPE is used, it may have a density of greater than 0.900 g/cm$^3$ and is preferably from 0.920 to 0.940 g/cm$^3$. The HPPE may have a molecular weight distribution Mw/Mn as determined by GPC from 5 to 40.

The "linear ethylene-α-olefin copolymers" described herein are as detailed in U.S. Ser. No. 12/130,135, filed May 13, 2008, which is incorporated herein by reference. These copolymers have individual chain lengths that are similar in carbon length (narrow MWD) but have a broad distribution of comonomer units among the chains (low CDBI), that is, some chains have almost no comonomer derived units and some chains have many comonomer units. The various parameters used to describe the linear ethylene-α-olefin copolymers are determined by techniques based on those described herein or known in the art.

In certain embodiments, the linear ethylene-α-olefin copolymer comprises at least 75 mol % or 80 mol % or 90 mol % or 95 mol % ethylene units. In certain embodiments the linear ethylene-α-olefin copolymers are linear low-density polyethylene resins produced by polymerization of ethylene and, optionally, an α-olefin comonomer having from 3 to 20 carbon atoms, 1-hexene in a particular embodiment, with a catalyst and activator as described further below. The linear ethylene-α-olefin copolymers may have up to 25 mol % α-olefin comonomer incorporated into the copolymer, with the range from 0.5 to 4 or 15 mol % in certain embodiments.

In certain embodiments, the linear ethylene-α-olefin copolymers have a melt index ($I_2$, 2.16 kg, 190° C.) within the range from 0.1 to 10 dg/min, and from 0.2 to 5 dg/min in another embodiment, and from 0.4 to 4 dg/min in yet another embodiment, and within the range of from 0.1 to 1.0 dg/min in a particular embodiment.

In certain embodiments, the linear ethylene-α-olefin copolymers have a high load melt index ($I_{21}$, 21.6 kg, 190° C.) within the range from 51 to 60 dg/min, and from 10 to 40 dg/min in another embodiment, and from 15 to 35 dg/min in a particular embodiment.

In certain embodiments the linear ethylene-α-olefin copolymers, characterized by having a relatively high Melt Index Ratio ("MIR", or $I_{21}/I_2$), possess an $I_{21}/I_2$ within the range from 20 or 25 to 30 or 35 or 40 or 50 or 60 or 70 or 80. In yet other embodiments, the linear ethylene-α-olefin copolymers have an $I_{21}/I_2$ of greater than 20 or 25 or 30.

In certain embodiments, the linear ethylene-α-olefin copolymers have a density within the range from 0.910 to 0.945 g/cm$^3$, and from 0.920 to 0.940 g/cm$^3$ in another embodiment, and from 0.921 to 0.935 g/cm$^3$ in yet another embodiment, and from 0.922 to 0.930 g/cm$^3$ in yet another embodiment.

In certain embodiments, the linear ethylene-α-olefin copolymers have an Mw/Mn within the range from 2.5 to 5.0, and from 2.5 to 4.5 in another embodiment, and from 2.8 to 4.5 in yet another embodiment, and from 2.8 to 4.0 in yet another embodiment and from 2.8 to 5.0 in yet another embodiment. In certain embodiments, the linear ethylene-α-olefin copolymers have an Mz/Mw within the range from 2.0 to 3.0 or 4.0.

In certain embodiments, the linear ethylene-α-olefin copolymers possess at least a 5 or 8 or 10 wt % fraction (alternatively, within a range from 5 to 8 or 10 or 15 or 20 wt %) that is soluble at 60° C. or less in xylene, where the soluble portion (as characterized by the Chemical Composition Fractions described below) has:

- an Mw (GPC) of 150,000 g/mol or more, and 200,000 g/mol or more in another embodiment, and 250,000 g/mol or more in yet another embodiment, and an upper limit of 600,000 g/mol or 1,000,000 g/mol in yet another embodiment,
- a CDBI of greater than 90 or 95,
- an Mw/Mn within the range of from 3 or 4 or 5 to 10 or 15 or 20 in certain embodiments, and is greater than 4 or 5 or 8 or 10 in other embodiments, and an Mw/Mn within the range 1.0 or 1.2 to 2.5 or 3.0,
- at least 5 mol % or 6 mol % or 7 mol % comonomer derived units in certain embodiments, and within the range of 4 or 5 mol % to 10 or 12 or 15 mol % in other embodiments, wherein the comonomer derives from $C_3$ to $C_{20}$ olefins in one embodiment, and derives from $C_4$ to $C_{12}$ α-olefins in yet another embodiment, and derives from 1-hexene, 1-octene, and/or 1-butene in a particular embodiment, the mole percentages (mol %) as determined by $^{13}$C NMR,
- a $r_1r_2$ value of 1.0 or 0.9 or 0.8 or 0.7 or less in certain embodiments, and within the range from 0.5 or 0.6 to 1.0 or 2.0 in other embodiments, and
- a "butyls" per 1000 carbons value of greater than 15 or 20 or 25 or 30 or 35 or 40 in certain embodiments, and within the range from 5 or 10 or 15 to 20 or 25 or 30 or 40 or 50 in other embodiments.

In certain embodiments the linear ethylene-α-olefin copolymers have a broad (e.g. less than 40%) composition distribution as measured by Composition Distribution Breadth Index (CDBI). For example, the linear ethylene-α-olefin copolymers have a CDBI less than 40%, and less than 30% in another embodiment, and within the range from 10% and 40% in yet another embodiment. In certain embodiments, the polymers useful herein may have a CDBI within the range from 1 to 40.

In certain embodiments the linear ethylene-α-olefin copolymers have a Mw from 10,000 to 500,000 g/mol, and from 10,000 to 250,000 g/mol in another embodiment. Preferably, the Mw is from 20,000 to 200,000 g/mol, or from 25,000 to 150,000 g/mol in yet another embodiment.

In certain embodiments the linear ethylene-α-olefin copolymers exhibit a melt temperature, $T_m$, as measured by differential scanning calorimetry ("DSC") from 90 or 95 or 100° C. to 125 or 130° C. $T_m$ is determined as follows: Samples weighing about 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. The melting temperature is measured and reported during the second heating cycle (or second melt). Prior to the DSC measurement, the sample is aged (typically by holding it at ambient temperature for a period up to about 5 days) or annealed to maximize the level of crystallinity.

In certain embodiments the linear ethylene-α-olefin copolymers contain less than 5 ppm hafnium, and less than 2 ppm hafnium in another embodiment, and less than 1.5 ppm hafnium in another embodiment, and less than 1 ppm hafnium in yet another embodiment. In other embodiments, the linear ethylene-α-olefin copolymers contains in within the range from 0.01 ppm to 2 ppm hafnium, and from 0.01 ppm to 1.5 ppm hafnium in another embodiment, and from 0.01 ppm to 1 or less ppm hafnium in yet another embodiment, as determined using Inductively Coupled Plasma Emission Spectrometry (ICPES) as follows: a sample is introduced into a plasma where it is atomized and the atoms ionized, the electrons in the atoms are excited to specified higher energy levels. When the electrons return to their ground state(s), they emit wavelengths of radiation characteristic of each element. The elements present in a sample are determined by monitoring the wavelengths of the emitted radiation. The amount of each atom present is determined from the intensities of the wavelengths by comparison to those generated by known standards.

Molecular weight distribution ("MWD") is $M_w/M_n$. Measurements of weight average molecular weight ($M_w$), number average molecular weight ($M_n$), and z-average molecular weight ($M_z$) are determined by Gel Permeation Chromatography as described in 34(19) MACROMOLECULES 6812 (2001) which is fully incorporated herein by reference. In such cases, a High Temperature Size Exclusion Chromatograph (SEC, Waters Alliance 2000), equipped with a differential refractive index detector (DRI) equipped with three Polymer Laboratories PLgel 10 mm Mixed-B columns is used. The instrument is operated with a flow rate of 1.0 cm$^3$/min, and an injection volume of 300 µl. The various transfer lines, columns and differential refractometer (the DRI detector) are housed in an oven maintained at 145° C. Polymer solutions are prepared by heating 0.75 to 1.5 mg/ml of polymer in filtered 1,2,4-trichlorobenzene ("TCB") containing about 1000 ppm of Butylated Hydroxy Toluene ("BHT") at 160° C. for 2 hours with continuous agitation. A sample of the polymer containing solution is injected into to GPC and eluted using filtered TCB containing about 1000 ppm of BHT.

The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) about 580 to 10,000,000, are used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a $2^{nd}$-order polynomial. The equivalent polyethylene molecular weights are determined by using the Mark-Houwink coefficients shown in Table 1.

TABLE 1

Mark-Houwink coefficients

| Material | k (dl/g) | A |
|---|---|---|
| PS | $1.75 \times 10^{-4}$ | 0.67 |
| PE | $5.79 \times 10^{-4}$ | 0.695 |

Composition distribution breadth index ("CDBI") is defined as the weight percent of the copolymer molecules having comonomer content within 50% of the median total molar comonomer content. The CDBI of a copolymer is determined utilizing well known techniques for isolating individual fractions of a sample of the copolymer calculated according to WO 93/03093. One such technique for isolating individual fractions is Temperature Rising Elution Fraction ("TREF"), as described in Wild, et al., 20 J. POLY. SCI., POLY. PHYS. ED. 441 (1982) and U.S. Pat. No. 5,008,204, which are fully incorporated herein by reference. In such cases, a commercial analytical TREF instrument (Model 200, Polymer-Char S.A.) is used. The polymer sample is dissolved into a solvent, crystallized onto a support and eluted from the support with an additional amount of the same solvent using a high precision pump as the temperature of the mixture is increased. Polymer chains fractionate by differences in their crystallization and melting behavior in the solvent. The concentration of eluting polymer is monitored with an infrared detector. A polymer sample is dissolved in 1,2-dichlorobenzene (2-5 mg of sample per milliliter of solvent at 160° C. for 60 minutes) and the resulting solution (0.5 ml) introduced into a packed column to crystallize: stabilized (maintain temperature) at 140° C. for 45 minutes, and then cooled to between 0° C. or 30° C. at 1° C./min and stabilized (maintain temperature) between 0° C. or 30° C. for 30 minutes. The sample is eluted from the column by pumping the solvent through the column at a flow rate of 1.0 ml/min for 10 minutes at 30° C. The temperature of the column is then ramped to 140° C. at a heating rate of 2° C./min as the solvent flow through the column is maintained at a flow rate of 1.0 ml/min. The concentration of eluting polymer is monitored with an infrared detector.

A commercial preparative TREF instrument (Model MC2, Polymer Char S.A.) is used to fractionate the resin into Chemical Composition Fractions. Approximately 2 g of polymer is placed into a reactor and dissolved in 200 ml of xylene, stabilized with 600 ppm of BHT, at 130° C. for approximately 60 minutes. The mixture is allowed to equilibrate for 45 minutes at 90° C., and then cooled to either 30° C. (standard procedure) or 15° C. (cryo procedure) using a cooling rate of 0.1° C./min. The temperature of the cooled mixture is increased until it is within the lowest Isolation Temperature Range to be used (see Table 2) and the mixture is heated to maintain its temperature within the specified range for 20 minutes. The mixture is sequentially filtered through a 75 micron column filter and then a 2 micron disk filter using 10 psi to 50 psi of pressurized nitrogen. The reactor is washed twice with 50 ml of xylene heated to maintain the temperature of the wash mixture within the designated temperature range and held at that temperature for 20 minutes during each wash cycle. The fractionation process is continued by introducing fresh xylene (200 ml of xylene, stabilized with 600 ppm of BHT) into the reactor, increasing the temperature of the mixture until it reaches the next highest Isolation Temperature Range in the sequence indicated in Table 2 and heating the mixture to maintain its temperature within the specified range for 20 minutes prior to filtering it as described above. The extraction cycle is sequentially repeated in this manner until the mixture has been extracted at all Isolation Temperature Ranges shown in Table 2. The extracts are independently precipitated with methanol to recover the individual polymer fractions.

TABLE 2

Preparative TREF Fractionation Isolation Temperature Ranges

| Chemical Composition Fraction Designation | | Isolation Temperature |
|---|---|---|
| Cryo Procedure | Standard Procedure | Range (° C.) |
| 1 | — | 0 to 15 |
| 2 | 1 | 15 to 36* |
| 3 | 2 | 36 to 51 |
| 4 | 3 | 51 to 59 |
| 5 | 4 | 59 to 65 |
| 6 | 5 | 65 to 71 |
| 7 | 6 | 71 to 77 |
| 8 | 7 | 77 to 83 |
| 9 | 8 | 83 to 87 |
| 10 | 9 | 87 to 91 |
| 11 | 10 | Greater than 91 |

*The Isolation Temperature Range for the Standard Procedure is 0 to 36° C.

Dynamic Direct Extraction is used to fractionate the resin into Molecular Weight Fractions, as described in W. Holtrup, 178 MAKROMOL. CHEM. 2335 (1977). In such cases, a solution of 1 g of polymer dissolved in 72 ml of hot (120 to 130° C.) xylene, stabilized with 2 g of 2,6-di-tert-butyl-4-methyl phenol per 4 liter of xylene, for 1.5 hour within a commercial Preparative TREF instrument (Model MC2, Polymer Char S.A.), is treated with 108 ml of non-solvent (diethylene glycol monobutyl ether, DEGME) for 30 min at a temperature of 120° C., before being filter. The polymer is precipitated from the filtrate using excess methanol. The fractionation process is repeated by extracting the gel phase left in the reactor using the volumetric ratios of xylenes/DEGME mixtures described in Table 3. In all these extractions, except the last, the indicated amount of xylene is added to the gel phase and the mixture heated between 120 to 130° C. for an hour before adding the DEGME and heating the mixture at 120° for 30 minutes prior to filtering the mixture and precipitating the polymer fraction using excess methanol. The last fractionation is conducted using xylene alone.

TABLE 3

Volumetric ratios of xylenes/DEGME mixtures used in Dynamic Direct Extraction

| | Solvent | | |
|---|---|---|---|
| | Xylene | DEGME | |
| Fraction | Volume (ml) | Volume (ml) | Percent |
| 1 | 72.0 | 108.0 | 60.0 |
| 2 | 84.6 | 95.4 | 53.0 |
| 3 | 91.8 | 88.2 | 49.0 |

TABLE 3-continued

Volumetric ratios of xylenes/DEGME mixtures used in Dynamic Direct Extraction

| | Solvent | | |
|---|---|---|---|
| | Xylene | DEGME | |
| Fraction | Volume (ml) | Volume (ml) | Percent |
| 4 | 95.4 | 84.6 | 47.0 |
| 5 | 100.3 | 79.7 | 44.3 |
| 6 | 102.6 | 77.4 | 43.0 |
| 7 | 103.7 | 76.3 | 42.4 |
| 8 | 104.6 | 75.4 | 41.9 |
| 9 | 105.7 | 74.3 | 41.3 |
| 10 | 180 | 0 | 0 |

The $^{13}$C NMR spectroscopic analysis is conducted as follows: Polymer samples for $^{13}$C NMR spectroscopy are dissolved in $d_2$-1,1,2,2-tetrachloroethane at concentrations between 10-15 wt % prior to being inserted into the spectrometer magnet. The $^{13}$C NMR data is collected at 120° C. in a 10 mm probe using a Varian spectrometer with a $^1$Hydrogen frequency of 700 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired using time averaging to provide a signal to noise level adequate to measure the signals of interest. $^{13}$C NMR chemical shift assignments and calculations involved in characterizing polymers are made as outlined in the work of M. R. Seger and G. Maciel in "Quantitative $^{13}$C NMR Analysis of Sequence Distributions in Poly(ethylene-co-1-hexene)" in 76 ANAL. CHEM. 5734-5747 (2004). Triad concentrations are determined by spectral integration and normalized to give the mole fraction of each triad: ethylene-ethylene-ethylene (EEE), ethylene-ethylene-hexene (EEH), ethylene-hexene-ethylene (EHE), hexene-ethylene-ethylene (HEE), hexene-ethylene-hexene (HEH), hexene-hexene-hexene (HHH). The observed triad concentrations are converted into the following diad concentrations: ethylene-ethylene (EE), hexene-hexene (HH) and ethylene-hexene (EH). The diad concentrations are then used to establish $r_1r_2$ as follows:

$$r_1r_2 = 4 * \frac{EE * HH}{(EH)^2}$$

Mole percent 1-hexene (Mol % comonomer) is determined as follows:

Mole Percent Hexene=(*HHH+HHE+EHE*)*100

Run Number is determined as follows:

$$\text{Run Number} = \left(HEH + \frac{1}{2} * HEE\right) * 100$$

Average ethylene run length is calculated by dividing the comonomer content by the run number. Average Ethylene Run Length=(HEH+EEH+EEE)/(run number).

The "Butyls" per 1000 carbons value is calculated by dividing the 1-hexene-centered triads by the sum of twice the ethylene-centered triads plus six times the 1-hexene-centered triads and the resultant quotient multiplying by 1000:

$$\text{Butyls per 1000 Carbons} = \frac{HHH + HHE + EHE}{6*(HHH + HHE + EHE) + 2(HEH + EEH + EEE)} * 1000$$

Proton ($^1$H) NMR data is collected at 120° C. in a 5 mm probe using a Varian Spectrometer with a $^1$Hydrogen frequency of at least 400 MHz. The data is recorded using a maximum pulse width of 45 degrees, 8 seconds between pulses and signal averaging 120 transients.

The linear ethylene-α-olefin copolymer can be produced by any suitable polymerization method and catalyst. In a preferred embodiment, the linear ethylene-α-olefin copolymer is produced by polymerization of ethylene and, optionally, an α-olefin, with a catalyst comprising a hafnocene compound, wherein the catalyst comprises from 95 mol % to 99 mol % of the hafnocene compound in one embodiment, and consists essentially of the hafnocene compound in another embodiment. In certain embodiments, the hafnocene compounds useful for polymerizing the one or more olefins is represented by the formula: $Cp^A Cp^B HfX_n$; wherein each X is chemically bonded to Hf, each Cp group is chemically bonded to Hf, and n is 0, 1, 2, 3 or 4. Preferably, n is 1 or 2. The ligands represented by $Cp^A$ and $Cp^B$ may be the same or different cyclopentadienyl ligands or ligands isolobal to cyclopentadienyl, either or both of which may contain heteroatoms and either or both of which may be substituted by a group R in any number of positions. In one embodiment, $Cp^A$ and $Cp^B$ are independently selected from the group consisting of cyclopentadienyl, indenyl, tetrahydroindenyl, fluorenyl, and substituted derivatives of each. Independently, each $Cp^A$ and $Cp^B$ may be unsubstituted or substituted with any one or combination of substituent groups R. The catalyst compounds described herein are typically used in combination with an activator (such as alumoxane or a non-coordinating anion activator (NCA)) with or without a trialkylaluminum scavenger or co-activator (such as triethylaluminum, tri-n-octyl aluminum, tri-isobutylaluminum). The catalyst compound combined with the activator (and optional co-activator) is referred to as a catalyst system.

In certain embodiments of the processes used to manufacture the linear ethylene-α-olefin copolymers described herein, the monomer supplied to the polymerization zone is regulated to provide a ratio of ethylene to α-olefin comonomer so as to yield a polyethylene having a comonomer content, as a bulk measurement, from 0.5 to 25.0 mol % comonomer. The reaction temperature, monomer residence time, catalyst system component quantities, and molecular weight control agent (such as $H_2$) may be regulated so as to provide a linear ethylene-α-olefin copolymer having the desired features as described herein. One skilled in the art will be able to optimize these modifier ratios and the given reactor conditions to achieve a targeted resin melt index, density, and/or other resin properties.

In certain embodiments at least one linear ethylene-α-olefin copolymer is present in the skin layer(s) of the multilayer films described herein within the range from 10 or 15 or 20 or 30 or 40 or 50 or 70 to 90 or 95 or 99 wt %, based upon the weight of the composition forming the layer. In a particular embodiment, the skin layer(s) consist essentially of (meaning that up to 4 wt % of "additives" such as fillers, antioxidants, etc. may be present) at least one linear ethylene-α-olefin copolymer.

The compositions used to form the core and skin layer(s) may be produced by melt-extruding the desirable polymer component and co-extruding the melts, or by mixing the linear ethylene-α-olefin copolymer with one or more polymers such as HPPE, LLDPE, HDPE, etc., by connecting reactors together in series to make reactor blends, or by using more than one catalyst in the same reactor to produce multiple species of polymer. The polymers can be mixed together prior to being placed into the film extruder or may be mixed in the extruder associated with the film making apparatus.

The compositions may be formed using conventional equipment and methods, such as by dry blending the individual components and subsequently melt blending in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder.

Additionally, "additives" may be included in the skin and/or core layers of the films, and/or in a product formed from the blend, such as a film, as desired. Such additives are well known in the art, and can include, for example: fillers; antioxidants (e.g., hindered phenolics such as Irganox™ 1010 or Irganox™ 1076 available from Ciba Corp.); phosphites (e.g., Irgafos™ 168 available from Ciba Corp.); anti-cling additives; tackifiers, such as polybutenes, terpene resins, aliphatic and aromatic hydrocarbon resins, alkali metal and glycerol stearates and hydrogenated rosins; UV stabilizers; heat stabilizers; anti-blocking agents; release agents; anti-static agents; pigments; colorants; dyes; waxes; silica; talc and the like.

The components that make up each film layer can be melt-blended either in the same melt-blending means used in the film-making process, or separately. In one embodiment, the components are combined in a melt-blending means separately from then being used in the film-making process. In a particular embodiment, the components are combined in an extruder or high intensity mixer, a twin screw extruder in one embodiment. A shear force and/or other heating means, if necessary, are applied to the components within the extruder to bring the temperature of the melt to at least the melting point of the highest melting component, and to at least 160 or 180 or 200 or 220 or 230° C. in preferred embodiments. In certain embodiments the core layer is extruded such that it has a higher melt temperature than the skin layer or layers, or vice versa. The extrusion melt temperature differential between the skin layers and the core layer or layers is at least 15° C. or 20° C. or 25° C. or 30° C. or 40° C.

To make films from the inventive compositions, any process that is known in the art can be used such as film-blowing, and casting; the inventive compositions can also be used in extrusion coating. In a preferred embodiment, the compositions are used to make blown films. Most any coextrusion blown film equipment known in the art can be used. In one aspect, there are some desirable extrusion conditions in making the inventive films.

The extruder speeds and outputs for making the films described herein are limited only to the capability of the equipment that is used. The extruder speed, output, and other process variables can vary for each layer that is extruded to make a film. The extruder output (of each individually, or combined) can be greater than 50 or 80 or 100 or 150 or 200 kg/h in certain embodiments, and within the range from 50 or 80 or 100 or 150 to 400 or 500 or 600 or 800 or 1000 kg/h in other embodiments. The melt temperature of the extrudate can be within the range from 150 to 230° C. in one embodiment, and from 160 to 200° C. in a particular embodiment. The melt pressure in the extruder (before the screen or after the screen pack, when present) can be within the range from 150 (15 MPa) to 500 bar (50 MPa) in one embodiment, and from 155 (15.5 MPa) to 400 bar (40 MPa) in another embodiment. The setpoint temperature of the extruder die can be within the range from 150 to 280° C. in one embodiment, and from 160 to 250° C. in another embodiment, and from 165 to 220° C. in yet another embodiment. Finally, the die temperature can range from 140 to 220° C. in one embodiment, and from 150 to 200° C. in another embodiment.

The films disclosed herein are at least two, three or more layers comprising at least one skin layer and at least one core layer. Each layer is typically extruded separately, then combined to form one film structure. In a particular embodiment, three layers of composition are extruded to form a three layer film. In certain embodiments, a collapsed bubble forms the final film in which one layer, at least one skin layer, and core layer are combined into a thick new layer. The composition making up the outer skin layer(s) of the blown film bubble preferably constitutes both skin layers of the final film. Preferably, the coextrusion blown film line has two, three or more (depending on the desired number of layers) extruders to melt, homogenize and pump the compositions making each layer of film. Any one of the extruders can have any set of desirable dimensions, independent of one another. Further, any one of the extruders can have a smooth feed zone or grooved feed zone. In one embodiment, the extruder has a diameter within the range from 30 or 40 mm to 50 or 60 or 80 or 90 or 100 or 200 mm and has a grooved feed zone or a smooth bore feed zone, preferably a smooth bore feed zone. In other embodiments, the diameter of the extruder is within the range from 40 to 80 mm, and from 50 to 80 mm in another embodiment, and from 50 to 200 mm in yet another embodiment. Further, the extruders used in the film making process can have a length/diameter (L/D) ratio within the range from 20 to 50 in one embodiment, and from 25 to 45 in another embodiment, and from 15 to 60 in yet another embodiment, and from 25 to 60 in yet another embodiment.

The polymers and/or additional components of the compositions described herein can be fed into the extruders by any means known in the art, such as by a gravimetric feeding system in one embodiment. Each extruder can be equipped with one, two, three, four, five or more feeding hoppers, depending upon the compositions. The blending for each extruder takes place in the special mixing hopper mounted below the feeding hoppers, from where the blend is discharged into the extruder. Each extruder is connected to the die via a screen changer and an adapter. The melt flows are shaped in the die through an annular gap.

After leaving the die, the tubular melt is drawn and blown as a bubble by air fed through the die in one embodiment. Typically, inside the bubble, cool air is blown on the melt, while the warm air is extracted via the exhaust pipe. The die diameter can be within a range from 100 to 500 mm in one embodiment, and from 190 to 350 mm in another embodiment, and from 200 to 300 mm in another embodiment, and from 210 to 280 mm in yet another embodiment. The blow up ratio ("BUR") for the blown films can be within a range from 1 to 10 in one embodiment, and from 1.5 to 8 in another embodiment, and from 1.8 to 5 in yet another embodiment, and from 2.0 to 3.5 in another embodiment, and from 2.2 to 3.0 in yet another embodiment; and the die gap can be within a range from 0.5 to 9 mm in one embodiment, and from 0.8 to 5 mm in another embodiment, and from 0.8 to 3 mm in yet another embodiment, and from 1.0 to 2.0 mm in yet another embodiment.

In any case, this air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from about 12 to 50 μm and by a development of biaxial orientation in the melt. The orientation of the film is manifested by the so called "shrink value," which in the MD direction is within the range from 50 or 60 to 90 or 100, and in the TD direction is within the range from −40 or −30 to −10 or 0.

In certain embodiments of the film blowing process, the composition melt is simultaneously cooled on the outside by a dual lip air ring. This air ring provides the main cooling and sets the frost line, which can be within the range from 100 or 500 to 1000 or 2000 mm in certain embodiments. The cooling air can be refrigerated in a heat exchanger connected to the chilled water circuit of the site. The bubble is stabilized in the calibration basket in certain embodiments, wherein the bubble then enters the collapsing stage. The flat tube leaving the collapsing frame passes immediately through the nip rolls that squeeze the film flat. The film can then be guided over several idler rollers to the web center table, for web alignment. From there the film can be further treated through the corona treating station to contact winder.

The films made from the inventive compositions can have any number of layers in any ratio of thicknesses. In a preferred embodiment, a three layer film is produced having two skin layers and a core layer sandwiched there between in a ratio within a range from 1/1/1 to 1/20/1 in one embodiment, and from 1/2/1 to 1/15/1 in another embodiment, and from 1/3/1 to 1/10/1 in yet another embodiment. Each layer can be any desirable thickness, and is within the range from 1 to 100 μm in one embodiment, and from 2 to 80 μm in another embodiment, and from 2 to 60 μm in yet another embodiment, and from 3 to 40 μm in yet another embodiment, and from 4 to 15 μm in yet another embodiment. Given the variety of film structures that are possible, the total film thickness can vary greatly. In one embodiment the total film thickness or "film thickness" (including all layers) is within the range from 10 to 500 μm, and from 15 to 300 μm in another embodiment, and from 20 to 150 μm in yet another embodiment, and from 20 to 80 μm in yet another embodiment, and from 20 to 50 μm in yet another embodiment. Of course, a desirable thickness range of the layers and film can comprise any combination of an upper limit with any lower limit as described herein.

Adequate processing stability is desired at, for example, throughput rates of greater than 1.0 or 1.5 or 2.0 or 2.5 or 3.0 kg/hr/cm die and high line speeds such as greater than 50 or 60 or 70 or 80 m/min for thin gauge manufacture on modern extrusion equipment. The films described herein are capable of being processed at such rates and speeds. Persons of skill in the art will recognize that varying throughput rates and line speeds may be used without departing from the spirit of the present invention(s).

In a particular embodiment, the films described herein are obtained by co-extruding a composition to form a core layer and at least one linear ethylene-α-olefin copolymer through at least one blown film die to form at least two sandwiching skin-layer compositions:

at a stretch rate of 2 sec$^{-1}$ or more (or 2 to 3 sec$^{-1}$ in another embodiment) (stretch rate (s$^{-1}$) equals $(V_f-V_0)$/FLH where $V_f$ is the speed of the melt at the frost line height, $V_0$ is the speed of the melt at the die exit and FLH is the frost line height), a processing time (die to frost line) of 2 seconds or less (or 0.5 to 2 seconds), a blow up ratio of 2.5 or less (or 1.5 to 2.5 in another embodiment), a frost line height of 1.0 meter or less (or 0.8 meters or less, or 0.66 meter or less, or 0.48 meters or less, or 1.0 to 0.1 meters in other embodiments), a die through put rate of 2.0 kg/hr/cm of die circumference or more (or 2.1 kg/hr/cm of die circumference or more, or 2.5 kg/hr/cm of die circumference or more in another embodiment, or 2.9 kg/hr/cm of die circumference in yet another embodiment), and such that three layers of ethylene polymer are formed, preferably a three layer film of 20-30 μm thickness wherein the two skin layers comprise at least one linear ethylene-α-olefin copolymer of $I_{21}/I_2$ of greater than 20.

In certain embodiments, the core layer of the films described herein comprise at least one polyethylene having an overall (combined polyethylenes) density of at least 0.910 g/cm$^3$ or at least 0.920 g/cm$^3$ or at least 0.925 g/cm$^3$. In other embodiments, different (lower) densities for at least the skin or outer layer or layers and the core layer or layers (higher densities than skin layer or layers) will also generally result in higher clarity than for two polyethylenes of the same or similar densities. In certain embodiments the density differential should be at least 0.005 g/cm$^3$, or 0.010 g/cm$^3$, or 0.015 g/cm$^3$, or 0.020 g/cm$^3$, or 0.030 g/cm$^3$, or at least 0.040 g/cm$^3$.

The LLDPEs that are useful as components of the core layer of the films include linear low density polyethylenes having a comonomer content within the range from 0.5 to 20 wt %, the comonomer derived from C3 to C10 α-olefins, preferably 1-butene or 1-hexene. The density of desirable LLDPEs are within the range from 0.910 to 0.940 g/cm$^3$, and within the range from 0.910 to 0.930 g/cm$^3$ in another embodiment, and within the range from 0.912 and 0.925 g/cm$^3$ in yet another embodiment. The melt index ($I_2$) of such LLDPEs is within the range from 0.1 or 0.2 or 0.4 to 4 or 6 or 10 dg/min. In one embodiment, the LLDPEs used to blend in the core layer are znLLDPEs. In certain embodiments, the core layer comprises from 50 or 60 to 80 or 85 or 99 wt %, by weight of the core layer, of LLDPE.

The HDPEs that are useful as components of the core layer of the films include linear low density polyethylenes having a comonomer content within the range from 0.01 to 5 wt %, the comonomer derived from C3 to C10 α-olefins, preferably 1-butene or 1-hexene, and is a homopolymer of ethylene in certain embodiments. The density of desirable HDPEs are within the range from 0.945 to 0.970 g/cm$^3$, and within the range from 0.950 to 0.965 g/cm$^3$ in another embodiment, and within the range from 0.955 and 0.965 g/cm$^3$ in yet another embodiment. The melt index ($I_2$) of such HDPEs is within the range from 0.1 or 0.2 or 0.4 to 4 or 6 or 10 dg/min. In one embodiment, the HDPEs used to blend in the core layer are Ziegler-Natta produced polymers. In certain embodiments, the core layer comprises from 1 or 5 or 10 to 40 or 50 wt %, by weight of the core layer, of HDPE.

The high pressure polyethylenes ("HPPEs") that are useful as components of the skin and/or layers of the films have a density within the range from 0.910 to 0.940 g/cm$^3$, and within the range from 0.910 to 0.930 g/cm$^3$ in another embodiment, and within the range from 0.912 and 0.925 g/cm$^3$ in a particular embodiment. The melt index ($I_2$) of such HPPEs is within the range from 0.1 or 0.2 or 0.4 to 4 or 6 or 10 dg/min, and is less than 1.0 dg/min in certain embodiments. In certain embodiments, the skin layer comprises from 0.1 or 1 or 2 to 8 or 10 wt %, by weight of the skin layer, of HPPE. In certain embodiments, the core layer comprises from 0.1 or 1 or 2 to 8 or 10 or 20 or 30 wt %, by weight of the core layer, of HPPE. In other embodiments, the HPPEs are substantially absent from the skin layers, and in other embodiments the HPPEs are substantially absent from the core layer, meaning that HPPEs are not added to the composition making up the layer or is only present to less than 5 wt % of the composition as an additive masterbatch carrier.

Certain embodiments of the films described herein comprise: (i) a core layer comprising from 50 or 60 to 75 or 95 wt %, by weight of the core layer, of a LLDPE and from 5 or 25 to 40 or 50 wt %, by weight of the core layer, of a HDPE; and (ii) two or more skin layers comprising one or more linear ethylene-α-olefin copolymers. Certain other embodiments of the films described herein comprise: (i) a core layer comprising from 55 or 65 to 85 or 95 wt %, by weight of the core layer, of a LLDPE and from 5 or 15 to 34 or 45 wt %, by weight of the core layer, of a HPPE; and (ii) and two or more skin layers comprising one or more linear ethylene-α-olefin copolymers. Certain other embodiments of the films described herein comprise: (i) a core layer comprising from 55 or 65 to 85 or 95 wt %, by weight of the core layer, of a LLDPE and from 5 or 15 to 34 or 45 wt %, by weight of the core layer, of one or more linear ethylene-α-olefin copolymers; and (ii) and two or more skin layers comprising one or more linear ethylene-α-olefin copolymers. Yet other embodiments of the films described herein comprise: (i) a core layer comprising from 55 or 65 to 85 or 95 wt %, by weight of the core layer, of a LLDPE and from 5 or 15 to 34 or 45 wt %, by weight of the core layer, of one or more linear ethylene-α-olefin copolymers and HDPEs; and (ii) and two or more skin layers comprising one or more linear ethylene-α-olefin copolymers. And yet other embodiments of the films described herein comprise: (i) a core layer comprising from 55 or 65 to 85 or 95 wt %, by weight of the core layer, of a LLDPE and from 5 or 15 to 34 or 45 wt %, by weight of the core layer, of one or more linear ethylene-α-olefin copolymers; and (ii) and two or more skin layers comprising one or more linear ethylene-α-olefin copolymers and HPPEs. The core and/or skin layers may comprise from 0.1 to 3 or 4 wt %, by weight of the layer, of additives as described herein.

The thickness of the films described herein may range from 4 to 200 μm in general and is largely determined by the intended use and properties of the film. Stretch films may be thin; those for shrink films or heavy duty bags are much thicker. Conveniently the film has a thickness from 5 to 200 μm, preferably from 10 to 180 μm, and especially at least 25 μm. The thickness of each of the skin layers may be at least 7% of the total thickness, preferably from 10 to 40%. The skin layer(s) may have a thickness less than that of the core layer. The core layer may be at least 20% of the total thickness. Where appropriate however the skins can be made thicker than the core layers, for example where a large amount or more heavily branched of a homogeneously branched linear polyethylene is used in the core layer, such as, for example, Enable™ metallocene polyethylenes (ExxonMobil Chemical Co.). Using at least 10 wt % of the homogeneously branched linear polyethylene in the core with a layer distribution of 4/1/4, would limit the total amount of branched polyethylene to less than 2 wt % assuming the balance of the core and the entire skin consists of non-branched polyethylenes.

The films described herein, preferably a three layer film of 20-30 μm thickness wherein the two skin layers comprise at least one linear ethylene-α-olefin copolymer of $I_{21}/I_2$ of greater than 20, may be characterized by one or a combination of the following properties:

Dart impact (ASTM D1709) of greater than 10 or 15 or 20 or 30 or 40 g/μm;

Haze (ASTM D1003 method B) of less than 10% or 8% or 5%;

MD Tensile Strength at Break of greater than 45 or 50 MPa;

TD Tensile Strength at Break of greater than 35 or 40 MP;

1% MD or TD Secant Modulus of greater than 290 or 300 or 310 MPa;

Elmendorf Tear MD of greater than 3 or 4 or 4.5 or 5 or 6 g/μm;

Elmendorf Tear TD of greater than 15 or 20 or 22 g/μm.

The films disclosed herein may be adapted to form flexible packaging films for a wide variety of applications such as cling film, low stretch film, non-stretch wrapping film, pallet shrink, over-wrap, agricultural, and collation shrink film and laminated films, including stand-up pouches. The film structures may be used for bags are prepared such as sacks, trash bags and liners, industrial liners, produce bags, and heavy duty bags. The bags may be made on vertical or horizontal form fill and seal equipment. The film may be used in flexible packaging, food packaging, for example, fresh cut produce packaging, frozen food packaging, bundling, packaging and unitizing a variety of products. A package comprising a film described above can be heat sealed around package content. The film and package can display an improved seal strengths in form fill in seal machinery; improved optical properties as measured by haze and improved stiffness and resistance to stretching that is useful for some applications. Flexible thin films comply readily with other surfaces and with suitable activation can be used as cling film. Thicker films with a relatively high amount of linear polyethylene can be cold stretched and exert a contracting force around articles or bundles of article around which they are wrapped.

The tendency to shrink when heated can be emphasized to provide shrink films. By providing suitable skin layers non-stretch film or stretch films can be heat sealed. Clear films may be used for wrapping articles and heat sealing for bags. In this case the films have a composition and structure and are made by a form of extrusion that limits heat shrinkage and stretch properties. These are referred to herein as wrapping films. Clear films may also be produced to have the ability to shrink, which is generally achieved by incorporating a long chain branched polymer which can be induced to shrink upon heating. These are referred to as heat shrink films. Clear films may also be produced to permit their stretching under ambient temperature conditions so that the return force can be used to achieve a bundling effect. These are referred to as stretch films.

Disclosed herein are examples of certain embodiments of the multilayer films.

EXAMPLES

Where applicable, the properties and descriptions of the films below are intended to encompass measurements in both the machine and transverse directions. Such measurements are reported separately, with the designation "MD" indicating a measurement in the machine direction, and "TD" indicating a measurement in the transverse direction. Elmendorf Tear was measured as specified by ASTM D1922. Tensile Strength at Yield was measured as specified by ASTM D-882. Tensile Strength at Break was measured as specified by ASTM D-882. Ultimate Tensile Strength was measured as specified by ASTM D-882. Tensile Peak Load was measured as specified by ASTM D-882. Tensile Energy was measured as specified by ASTM D-882. Elongation at Yield was measured as specified by ASTM D-882. Elongation at Break was measured as specified by ASTM D-882. 1% Secant Modulus was measured as specified by ASTM D-882. Melt Index, $I_2$ refers to the melt flow rate measured according to ASTM D-1238, condition E. High Load Melt Index, $I_{21}$, refers to the melt flow rate measured according to ASTM D-1238, condition F. Density was determined measured as specified by ASTM D-1505 using chips cut from plaques compression molded in accordance with ASTM D-4703-07, aged in for 40 hrs at 23° C. plus or minus 2° C., unless specifically stated otherwise. Dart Drop (also known as Dart $F_{50}$, or Dart Drop Impact or Dart Drop Impact Strength) was measured as specified by ASTM D-1709, method A. Haze was determined according to ASTM D1003 method B using a Hunterlab Color Spectrophotometer.

Example 1

Blown Films Comprising Skins of Linear Ethylene-α-Olefin Copolymers

Two inventive and two comparison films were blown and tested. The characterization for each film is summarized in Tables 4 and 5, the films having a 1/2/1 layer distribution. The linear ethylene-α-olefin copolymer ("EAO") used in these inventive examples had a melt index $I_2$ of 0.96 dg/min, a flow index $I_{21}$ of 21.7 dg/min, a $I_{21}/I_2$ of 22.5, and a density (ASTM plaque) of 0.9178 g/cm³. The linear ethylene-α-olefin copolymers used in all of the examples were produced using a supported catalyst prepared from bis(n-propylcyclopentadienyl) hafnium dimethyl (Boulder Scientific, Colorado, USA) and Ineos™ ES757 (microsphereoidal silica with a 25 micron average particle size) with alumoxane (Al:Hf ratio of about 99:1) in a 5000 cubic foot (approx. 142,000 liters) fluidized bed gas phase reactor operated at about 77° C. using an ethylene partial pressure of about 200 psi (1.38 MPa), a ethylene-to-hexene ratio of about 0.0150, and 10.0 mole percent isopentane.

Additives were blended into the inventive example: 500 ppm Irganox 1076, 2000 ppm Weston™ 399B (phosphite, Borg-Warner Chemical Co.), and 800 ppm Dynamar™ 5920A (fluoropolymer, 3M-Dyneon). The compounded EAO with additives had a melt index $I_2$ of 0.84 dg/min, a flow index $I_{21}$ of 20.3 dg/min, a $I_{21}/I_2$ of 24.2, and a density (ASTM plaque) of 0.9188 g/cm³. Films A-D were three-layer film having two skin layers sandwiching a single core layer with a total thickness of 23-26 μm. Films A and C are inventive films, and Films B and D are comparative films.

The film structures are as follows, wherein LL1001 is a Ziegler-Natta LLDPE with a $I_2$ of 1.0 dg/min and a density of 0.918 g/cm³ (ExxonMobil Chemical Co.), HTA-108 is a HDPE with a $I_2$ of 0.70 dg/min, and $I_{21}$ of 46 dg/min and a density of 0.961 g/cm³ (ExxonMobil Chemical Co.), and MB42 is an antigel formation masterbatch (10 wt % in LDPE), and Exceed™ 1018 polyethylene is a metallocene produced LLDPE with an $I_2$ of 1.0 dg/min and density of 0.918 g/cm³ (ExxonMobil Chemical Co.), and LD166 ($I_2$ of 0.20 dg/min and a density of 0.923 g/cm³) and LD150BW ($I_2$ of 0.75 dg/min and a density of 0.923 g/cm³) are high pressure-produced low density polyethylenes ("HPPE") (ExxonMobil Chemical Co.):

Film A (Inventive):
 Core layer: 68.4 wt % LL1001+30 wt % HTA-108+1.6 wt % MB42
 Skin layers: 95 wt % EAO+5 wt % LD150BW
Film B (Comparative):
 Core layer: 68.4 wt % LL1001+30 wt % HTA-108+1.6 wt % MB42
 Skin layers: 95 wt % Exceed 1018A+5 wt % LD150BW
Film C (Inventive):
 Core layer: 78.4 wt % LL1001+20 wt % LD166+1.6 wt % MB42
 Skin layers: 100 wt % EAO
Film D (Comparative):
 Core layer: 78.4 wt % LL1001+20 wt % LD166+1.6 wt % MB42
 Skin layers: 100 wt % Exceed 1018CA The film blowing conditions for Example 1 were as follows: A Windmöeller and Höelscher blown film line was used, the melt pressure was about 350 bar (35 MPa) before the screen pack, BUR of 2.5, die diameter of 250 mm, die gap of 1.4 mm, frost line height of 840 mm, haul-off speed of 74 m/min, temperature settings were: extruder A=190, extruder B=220, and extruder C=190° C.; the die body was set at 220° C.; and output rates for each extruder (for each layer) were: extruder A=50, extruder B=100, and extruder C=50 kg/h, overall 200 kg/h.

Example 2

Blown Films Comprising Skins of Linear Ethylene-α-Olefin Copolymers of Higher $I_{21}/I_2$ Two inventive and two comparison films were blown and tested, wherein the inventive films included skin layers comprising the linear ethylene-α-olefin copolymer having a relatively high $I_{21}/I_2$ compared to Example 1. The characterization for each film is summarized in Tables 6 and 7, the films having a 1/2/1 layer distribution. The compounded (using the same additives as in Example 2) linear ethylene-α-olefin copolymer ("EAO") used in these inventive examples had a melt index $I_2$ of 0.69 dg/min, a flow index $I_{21}$ of 22.47 dg/min, a $I_{21}/I_2$ of 32.6, and a density (ASTM plaque) of 0.9213 g/cm³. Films E-H were three-layer films having two skin layers sandwiching a single core layer with a total thickness of 23-26 μm. Films E and G are inventive films, and Films F and H are comparative films. The film structures are as follows, wherein LL1001 is a Ziegler-Natta LLDPE, HTA-108 is a HDPE, and MB42 is an antigel formation masterbatch (10 wt % in LDPE), Exceed™ 1018 polyethylene is a metallocene produced LLDPE (ExxonMobil Chemical Co.), and LD150BW and LD166 are high pressure-produced low density polyethylenes ("HPPE"), each component having the properties as described in Example 1:

Film E (Inventive):
 Core layer: 78.4 wt % LL1001+20 wt % LD166+1.6 wt % MB42
 Skin layers: 95 wt % EAO+5 wt % LD150BW
Film F (Inventive):
 Core layer: 78.4 wt % LL1001+20 wt % LD166+1.6 wt % MB42
 Skin layers: 100 wt % EAO
Film G (Comparative):
 Core layer: 78.4 wt % LL1001+20 wt % LD166+1.6 wt % MB42
 Skin layers: 95 wt % Exceed 1018CA+5 wt % LD150BW
Film H (Comparative):
 Core layer: 78.4 wt % LL1001+20 wt % LD166+1.6 wt % MB42
 Skin layers: 100 wt % Exceed 1018CA The film blowing conditions for Example 2 were as in Example 1.

TABLE 4

| Example 1 blown film properties | | | | |
|---|---|---|---|---|
| Property | FILM A | FILM B | FILM C | FILM D |
| DART IMPACT A | | | | |
| WF (g) | 457.1 | 168.2 | 1186.7 | 240.0 |
| WF/μm (g/μm) | 16.93 | 6.73 | 45.64 | 9.60 |

TABLE 4-continued

Example 1 blown film properties

| Property | FILM A | FILM B | FILM C | FILM D |
|---|---|---|---|---|
| Tensile properties in MD | | | | |
| Thickness (μm) | 26 | 26 | 26 | 24 |
| 10% offset yield (MPa) | 12.8 | 12.5 | 11.4 | 12.5 |
| Man. Yield 2 (MPa) | 14.0 | 13.9 | 15.2 | 16.7 |
| Tensile Strength at Break (MPa) | 52.5 | 56.0 | 51.8 | 50.5 |
| Elongation at Break (%) | 505 | 567 | 495 | 496 |
| Energy at Break (mJ/mm³) | 114 | 137 | 115 | 124 |
| 1% secant Modulus (MPa) | 310 | 294 | 233 | 240 |
| Strain Hardening Factor (MPa) | 21.0 | 18.5 | 20.3 | 18.2 |
| Draw ratio (%) | 329 | 344 | 313 | 328 |
| Max. Holding Force (MPa) | 15.5 | 15 | 17.7 | 18.8 |
| Tensile properties in TD | | | | |
| Thickness (μm) | 25 | 25 | 26 | 25 |
| 10% offset yield (MPa) | 12.9 | 11.6 | 10.3 | 10.3 |
| Man. Yield 2 (MPa) | 11.4 | 10.7 | 10.0 | 10.1 |
| Tensile Strength at Break (MPa) | 43.2 | 36.3 | 40.7 | 41.8 |
| Elongation at Break (%) | 604 | 592 | 575 | 595 |
| Energy at Break (mJ/mm³) | 101 | 93 | 93 | 100 |
| 1% secant Modulus (MPa) | 333 | 289 | 283 | 278 |
| Strain Hardening Factor (MPa) | 15.8 | 13.2 | 15.9 | 15.3 |
| Draw ratio (%) | 414 | 410 | 387 | 390 |
| Max. Holding Force (MPa) | 12.7 | 12.1 | 10.3 | 10.5 |
| Elmendorf Tear | | | | |
| Elmendorf Tear (g/μm) MD | 6.36 | 6.97 | 4.13 | 4.25 |
| Elmendorf Tear (g/μm) TD | 23.9 | 24.6 | 22.8 | 22.6 |
| PUNCTURE Resistance | | | | |
| Force at Break (N/μm) | 2.88 | 3.02 | 3.32 | 3.76 |
| Energy at Break (mJ/μm) | 207 | 221 | 219 | 269 |

TABLE 5

Example 1 blown film properties

| Property | FILM A | FILM B | FILM C | FILM D |
|---|---|---|---|---|
| HUNTERLAB HAZE | | | | |
| X | 90.0 | 90.0 | 90.1 | 90.1 |
| Y | 91.8 | 91.8 | 91.9 | 91.9 |
| Z | 108.3 | 108.2 | 108.3 | 108.3 |
| HAZE | 2.85 | 2.20 | 2.28 | 1.98 |
| ZEHNTNER GLOSS 45° | | | | |
| Gloss (°) (avg. of 5) | 89.7 | 93.4 | 88.5 | 90.5 |
| ZEBEDEE CL-100 | | | | |
| Clarity (%) (avg. of 5) | 72.8 | 73.2 | 71.2 | 71.8 |
| BETEX SHRINK | | | | |
| MD (%) | +73 | +76 | +80 | +81 |
| TD (%) | −20 | −20 | −13 | −13 |

TABLE 6

Example 2 blown film properties

| Property | FILM E | FILM G | FILM F | FILM H |
|---|---|---|---|---|
| DART IMPACT A | | | | |
| WF (g) | 1163.3 | 364.3 | 673.3 | 240.8 |
| WF/μm (g/μm) | 48.47 | 14.57 | 26.93 | 9.26 |
| Tensile Properties MD | | | | |
| Thickness (μm) | 23 | 25 | 25 | 24 |
| MD 10% offset yield (MPa) | 14.1 | 12.4 | 12.9 | 12.2 |
| MD Man. Yield 2 (MPa) | 18.2 | 15.9 | 17.2 | 16.3 |

TABLE 6-continued

Example 2 blown film properties

| Property | FILM E | FILM G | FILM F | FILM H |
|---|---|---|---|---|
| MD Tensile Break (MPa) | 63.7 | 56.4 | 58.0 | 56.1 |
| MD Elong. Break (%) | 475 | 552 | 461 | 552 |
| MD Energy (mJ/mm3) | 137 | 141 | 124 | 146 |
| MD 1% sec. Mod. (MPa) | 294 | 241 | 278 | 240 |
| MD Strain hardening factor (MPa) | 25.7 | 19.0 | 22.7 | 18.5 |
| MD Draw ratio (%) | 303 | 353 | 293 | 354 |
| MD Max. Holding Force (MPa) | 20.2 | 18.0 | 19.3 | 19.0 |
| Tensile Properties TD | | | | |
| Thickness (μm) | 24 | 25 | 25 | 25 |
| TD 10% offset yield (MPa) | 12.4 | 10.9 | 11.6 | 10.9 |
| TD Man. Yield 2 (MPa) | 11.3 | 10.5 | 10.6 | 10.3 |
| TD Tensile Break (MPa) | 39.4 | 43 | 37.9 | 45.9 |
| TD Elong. Break (%) | 590 | 589 | 595 | 620 |
| TD Energy (mJ/mm³) | 97 | 100 | 94 | 109 |
| TD 1% sec. Mod. (MPa) | 354 | 280 | 350 | 281 |
| TD Strain hardening factor (MPa) | 15.2 | 16.9 | 15.1 | 16.1 |
| TD Draw ratio (%) | 408 | 398 | 420 | 400 |
| TD Max. Holding Force (MPa) | 11.4 | 10.0 | 10.8 | 10.2 |
| Elmendorf Tear | | | | |
| Tear (g/μm) MD | 3.43 | 3.89 | 3.28 | 3.50 |
| Tear (g/μm) TD | 21.2 | 25.2 | 24.7 | 23.7 |
| Puncture Resistance | | | | |
| Force at Break (N/μm) | 3.18 | 3.47 | 3.03 | 3.49 |
| Energy at Break (mJ/μm) | 197 | 238 | 181 | 243 |

TABLE 7

Example 2 blown film properties

| Property | FILM E | FILM G | FILM F | FILM H |
|---|---|---|---|---|
| HUNTERLAB HAZE | | | | |
| X | 89.8 | 89.9 | 90.0 | 89.9 |
| Y | 91.7 | 91.7 | 91.8 | 91.8 |
| Z | 107.7 | 107.9 | 108.0 | 108.0 |
| HAZE | 4.01 | 2.18 | 3.88 | 1.26 |
| ZEHNTNER GLOSS 45° | | | | |
| Gloss (°) (avg. of 5) | 78.4 | 91.4 | 78.8 | 94.5 |
| ZEBEDEE CL-100 | | | | |
| Clarity (%) (avg. of 5) | 80 | 84 | 80 | 84 |
| BETEX SHRINK | | | | |
| MD (%) | +81 | +79 | +81 | +81 |
| TD (%) | −11 | −12 | −12 | −11 |

Having described the various features and embodiments of the film(s), described herein in numbered embodiments is:

1. A blown film with a dart impact (ASTM D1709) of greater than 10 g/μm and a Haze (ASTM D1003 method B) of less than 10% comprising at least two skin layers and at least one core layer there between, wherein the core layer comprises at least one polyethylene having an overall density of at least 0.910 g/cm³; and the skin layers comprise at least one linear ethylene-α-olefin copolymer having an $I_{21}/I_2$ of greater than 20; a density within the range from 0.910 to 0.945 g/cm³; an Mw/Mn within the range from 2.0 to 5.0; and at least a 5 wt % portion that is soluble at 60° C. or less in xylene, where the soluble portion has:

an Mw (GPC) of 150,000 g/mol or more;

at least 5 mol % $C_3$ to $C_{20}$ comonomer as determined by $^{13}$C NMR, a $r_1r_2$ value of 1.0 or less, and
a "butyls" per 1000 carbons value of 15 or more.

2. The film of numbered embodiment 1, wherein at least one skin layer comprises from 0.1 to 20 wt %, by weight of the skin layer, of HPPE.

3. The film of numbered embodiments 1 or 2, wherein the core layer comprises from 0.1 to 20 wt %, by weight of the core layer, of HPPE.

4. The film of any of the previously numbered embodiments, wherein HPPE are substantially absent from the core layer.

5. The film of any of the previously numbered embodiments, wherein the core layer comprises at least one LLDPE.

6. The film of any of the previously numbered embodiments, wherein the core layer also comprises a HDPE.

7. The film of numbered embodiment 6, having an MD Tensile Break of greater than 45 MPa, and a TD Tensile Break of greater than 35 MPa.

8. The film of any of the previously numbered embodiments, wherein the LLDPE has a density within the range from 0.900 to 0.925 g/cm$^3$.

9. The film of any of the previously numbered embodiments, wherein at least one linear ethylene-α-olefin copolymer has an $I_{21}/I_2$ within the range from 20 to 35.

10. The film of any of the previously numbered embodiments, wherein the film has a dart impact (ASTM D1709) of greater than 15 g/mm.

11. The film of any of the previously numbered embodiments, wherein there are different (lower) densities for at least the skin or outer layer or layers and the core layer or layers (higher densities than skin layer or layers), density differential being equal to or greater than 0.005 g/cm$^3$.

12. The film of any of the previously numbered embodiments, wherein the linear ethylene-α-olefin copolymer has a CDBI of less than 40%.

13. The film of any of the previously numbered embodiments, wherein the linear ethylene-α-olefin copolymer is produced by contacting at least ethylene and a hafnocene compound and an activator.

14. A method of producing the film of any of the previously numbered embodiments comprising coextruding a melt of at least the one core layer composition having two faces and at least one skin layer composition, each adjacent to both faces of the core layer, through an annular die; followed by drawing the tubular melts by blowing the layered melt into a bubble by air fed through the die.

15. The method of numbered embodiment 14, wherein an extruder extrudes the melt of the core layer and at least one extruder extrudes the melt of the skin layers, the combined output being greater than 50 kg/h.

16. The method of numbered embodiments 14 or 15, wherein extrusion melt temperature differential between the skin layers and the core layer or layers is at least 15° C.

17. The method of numbered embodiments 14-16, wherein the films described herein are obtained by extruding the linear ethylene-α-olefin copolymer through the blown film die at a stretch rate of 2 sec$^{-1}$ or more, a processing time of 2 seconds or less, a blow up ratio of 2.5 or less, a frost line height of 1.0 meter or less, and a die throughput rate of 2.0 kg/hr/cm of die circumference or more.

18. A blown film or method of any of the previous numbered embodiments comprising at least two skin layers and at least one core layer there between, wherein the film has a dart impact (ASTM D1709) of greater than 10 g/μm, a Haze (ASTM D1003 method B) of less than 10%, an MD Tensile Break of greater than 45 MPa, and a TD Tensile Break of greater than 35 MPa.

What is claimed is:

1. A blown film comprising at least two skin layers and at least one core layer there between, wherein:
    (a) the skin layers comprise at least one linear ethylene-α-olefin copolymer having an $I_{21}/I_2$ of greater than 20; a density within the range from 0.910 to 0.945 g/cm$^3$; an Mw/Mn within the range from 2.0 to 5.0; and at least a 5 wt % portion that is soluble at 60° C. or less in xylene, where the soluble portion has:
        i) an Mw (GPC) of 150,000 g/mol or more;
        ii) at least 5 mol % $C_3$ to $C_{20}$ comonomer as determined by $^{13}$C NMR;
        iii) a $r_1r_2$ value of 1.0 or less; and
        iv) a "butyls" per 1000 carbons value of 15 or more; and
    (b) the core layer comprises at least one polyethylene having an overall density of at least 0.910 g/cm$^3$;
    wherein the film has a dart impact (ASTM D1709) of greater than 10 g/μm and a Haze (ASTM D1003 method B) of less than 10%.

2. The film of claim 1, wherein at least one skin layer comprises from 0.1 to 20 wt %, by weight of the skin layer, of HPPE.

3. The film of claim 1, wherein the core layer comprises from 0.1 to 20 wt %, by weight of the core layer, of HPPE.

4. The film of claim 1, wherein HPPE are substantially absent from the core layer.

5. The film of claim 1, wherein the core layer comprises at least one LLDPE.

6. The film of claim 1, wherein the core layer also comprises a HDPE.

7. The film of claim 6, having an MD Tensile Break of greater than 45 MPa, and a TD Tensile Break of greater than 35 MPa.

8. The film of claim 1, wherein the LLDPE has a density within the range from 0.900 to 0.925 g/cm$^3$.

9. The film of claim 1, wherein at least one linear ethylene-α-olefin copolymer has an $I_{21}/I_2$ within the range from 20 to 35.

10. The film of claim 1, wherein the film has a dart impact (ASTM D1709) of greater than 15 g/μm.

11. The film of claim 1, wherein there are different (lower) densities for at least the skin or outer layer or layers and the core layer or layers (higher densities than skin layer or layers), density differential being equal to or greater than 0.005 g/cm$^3$.

12. The film of claim 1, wherein the linear ethylene-α-olefin copolymer has a CDBI of less than 40%.

13. The film of claim 1, wherein the linear ethylene-α-olefin copolymer is produced by contacting at least ethylene and a hafnocene compound and an activator.

\* \* \* \* \*